TONE SIGNALLING BANDWIDTH COMPRESSION SYSTEM

Filed March 17, 1967 2 Sheets-Sheet 1

INVENTORS
JAMES E. YOUNG
KENT W. HEMPHILL
BY Ronald Zibelli
ATTORNEY

TONE SIGNALLING BANDWIDTH COMPRESSION SYSTEM

Filed March 17, 1967 2 Sheets-Sheet 2

INVENTORS
JAMES E. YOUNG
KENT W. HEMPHILL
BY Ronald Zibelli
ATTORNEY

United States Patent Office 3,502,815

Patented Mar. 24, 1970

3,502,815
TONE SIGNALLING BANDWIDTH COMPRESSION SYSTEM

James E. Young, Pittsford, and Kent W. Hemphill, Rochester, N.Y., assignors to Xerox Corporation, Rochester, N.Y., a corporation of New York Filed Mar. 17, 1967, Ser. No. 624,003
Int. Cl. H04b *1/66*
U.S. Cl. 179—15.55 17 Claims

ABSTRACT OF THE DISCLOSURE

A bandwidth compression technique utilizing the statistical distribution of information on a document or other graphic display means for information transmission. Information is scanned and encoded, and by the use of an incremental tape recorder an eleven level frequency modulation tone signal can be transmitted and the desired bandwidth compression obtained.

BACKGROUND

As is known in a normal facsimile system, a document to be transmitted is scanned at a transmitting station to convert information on the document into a series of electrical signals. These video signals, or carrier modulated signals corresponding thereto, are then coupled to the input of a communication link interconnecting the transmitter with a receiver. At a receiving location, the video signals, in conjunction with suitable synchronizing signals, selectively control the actuation of appropriate marking means to generate a facsimile of the document transmitted.

A principal application of facsimile equipment is the transmission of printed or typewritten documents and letters. It is a distinguishing characteristic of such original documents that printing or typing is arranged in substantially horizontal lines. Examination of a typical letter, for example, will show that lines of typing actually occupy considerably less than half the vertical division of the letter, the rest of its dimension being blank and corresponding to spaces between lines as well as blank spaces at the top and bottom of the letter. In a conventional facsimile system, all parts of such a letter are normally scanned at a uniform rate. Assuming transmission over an ordinary telephone line, it may take in the order of six to fifteen minutes to transmit an ordinary letter with reasonable resolution. Considering the cost of the telephone service, such a long transmission time becomes a serious limitation on the economic usefulness of facsimile equipment.

The signal redundancy inherent in facsimile output waveforms due, for example, to the fact that the waveform comprises two level binary information and the attendant long periods of little or no information transmission, have led to the development of encoding techniques to reduce such redundancy, thereby eliminating wasted transmission time. One such encoding techniqu is known as run length encoding in which binary numbers corresponding to various blocks of binary data are transmitted rather than the usual binary signals. In such a system, a binary number of relatively few bits may be sent in lieu of a larger block of video data.

Such encoding techniques, while significantly reducing the number of binary digits or bits which must be sent and thereby reducing the transmission time, have not been entirely satisfactory. In a normal facsimile system, for example, the information is, in general, not uniformly spread over the document surface; thus, the rate at which the scanner presents information to the transmission channel varies with time and sometimes a complete scan line may consist of a single information bit, black or white, while the rest of the line is the other level. For this reason, conventional binary transmission systems with known encoding techniques do not fully utilize the full capacities of the transmission channels, and thus the cost thereof remains prohibitively high.

OBJECTS

It is, accordingly, an object of the present invention to provide methods and apparatus for efficiently utilizing the bandwidth capabilities of graphic communication and transmission systems.

It is another object of the present invention to optimize the information handling capability of transmission networks in graphic communication systems.

It is another object of the present invention to reduce the operating cost of transmitting binary data information waveforms that include long periods of redundant information.

It is still another object of the present invention to decrease the time bandwidth product requirement for binary information transmission.

It is still another object of the present invention to utilize the statistical distribution of information on a document to reduce the amount of information to be transmitted in a facsimile communication system.

It is still another object of the present invention to utilize the statistical distribution of information on a document in conjunction with an incremental recorder to generate a plurality of frequency modulation tone levels for the transmission of facsimile communication information.

BRIEF SUMMARY OF THE INVENTION

In accomplishing the above and other desired aspects, applicants have invented novel methods and apparatus for reducing the redundant information in transmitted digital waveforms. A facsimile scanner produces an ouptput signal which can be considered random pulse duration modulation (PDM) signals. These black and white random PDM signals are then converted into pulse amplitude modulation (PAM) signals in which the amplitude is a function of the pulse duration and the transfer of these PAM signals from a buffer at a uniform rate to an incremental recording system which records this amplitude at a constant rate. Upon completion of the recording of the document, the PAM recording is played back and converted into FM tones on a statistical basis and transmitted.

At the receiver location, the received tones are converted to a pulse amplitude modulation signal at a constant information rate and recorded in a continuous recording mode. Upon completion of the transmission, the pulse amplitude information is incrementally read out and fed into a small buffer unit.

The buffer is read out and the black and white information is converted into variable pulse duration modulation signals and recorded. Both the incremental recording and buffer units are read out a rate controlled by the recording mechanism.

DESCRIPTION OF THE DRAWINGS

For a more complete understanding of applicants' invention, reference may be had to the following detailed description in conjunction with the drawings wherein.

DETAILED DESCRIPTION OF THE INVENTION

In the scanning of a black and white document, the photodetector output in its response to the modulation of a flying spot scanner by the image produces an output which can be considered random pulse duration modulation signals. Both the pulse repetition frequency and pulse duration are functions of the image content of the scanned document. The desired characteristics of a facsimile transmission system designed for communicating over a narrow band channel are time compression of the image and background areas, a constant information rate, and FM signalling.

Figure 1:
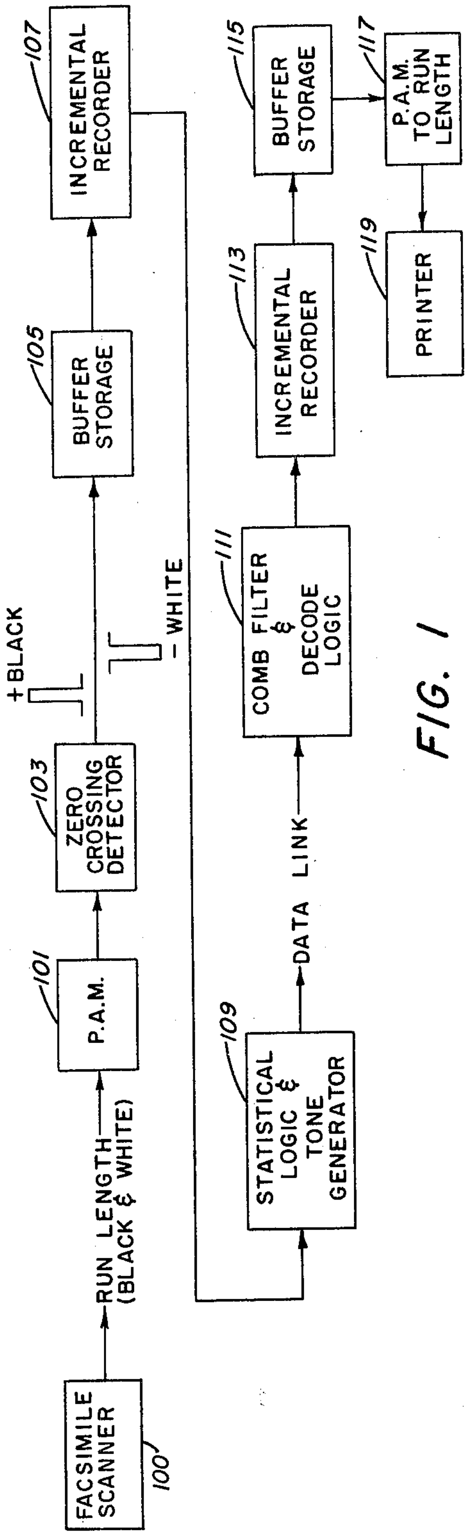
FIGURE 1 is a block diagram of the overall system in accordance with the principles of the present invention.

Such a transmission system is shown in FIGURE 1. A facsimile scanner 100 derives a variable pulse duration modulation signal representing both black and white information on a document or other display media. This information is passed to the pulse amplitude modulation converter 101 for the conversion of the black and white random PDM signals into pulse amplitude modulation (PAM) signals in which the amplitude is a function of the pulse duration. A zero-crossing detector 103 detects the zero-crossings of the pulse amplitude modulated signals and generates finite width signals in accordance with the informational content as black or white signals. A buffer storage unit 105 receives these black and white PAM signals, indicative of the run lengths of detected information, at the rate at which they are generated at the facsimile scanner. The signals are transferred from the buffer storage unit 105 at a uniform rate to the incremental recorder 107 which records this amplitude at a constant rate. Upon completion of the recording of the document, the PAM recording at the incremental recorder 107 is played back and converted into FM tones by a statistical logic and tone generator apparatus 109. The information is then transmitted to the remote location over a transmission medium at the rate approaching the maximum bandwidth capabilities of the medium.

The conversion to the tones can utilize either multiple tone parallel transmission or combination tone transmission in which the amplitude is transmitted as a combination of tones. The appropriate encoding can be assigned to achieve skip over noninformation-containing portions of the document without loss of synchronism or any of the information content. The effective conversion of run lengths of both black and white information to single sampling period transmission times results in overall compression of the transmitted image. The statistics of the image are document-dependent and, therefore, the obtainable compression will be a function of the scanned document.

Still referring to FIGURE 1, the received tones at the receiver are converted by the comb filter and decode logic 111 to a pulse amplitude modulation signal at a constant information rate and continuously recorded at recorder 113. Upon completion of the transmission, the pulse amplitude information is incrementally read out from the recorder 113 and fed to buffer storage unit 115. The buffer is read out and the black and white information is converted into variable pulse duration modulation signals and recorded by any known printing mechanism 119. Both the incremental recording unit 113 and buffer are read out by unit 117 at a rate controlled by the recording mechanism 119.

In addition to the recording technique as hereinbefore described, such a recording process could also be accomplished after the conversion of the PAM signals into the appropriate frequency modulation tones. In this mode, using acoustical couplnig to the communication network, the facsimile machine operator would dial up the appropriate communication link and simply play back the tone recording through the acoustical coupling device. On the receiving end, the incoming tones would be recorded and played back through the receiver recorder at will and upon completion of the transmission. In this mode of operation, multiple documents can be batched, stored and forwarded as desired. At the receiver, multiple copies can be produced by using multiple playback techniques.

An additional feature of the disclosed facsimile system using a compression and transmission system as proposed, would be the compability of the facsmile transmitter with output cartridges prepared on modified electric typewriters. In such a system, the coded output from the typewrier recorded on incremental magnetic tape would be inserted into the facsimile machine converted to FM tone signalling, transmitted and recorded on the receiving facsimile equipment for subsequent playback through another modified electric typewriter. The incorporation of this feature would allow a single system to perform the transmission of already prepared graphic information, i.e., facsimile, or the transmission using the same acoustical coupler and equipment of digital data wherein the output is simultaneously prepared with the document creation. Such incremental magnetic tape recorders as utilized herein are readily available from the Kennedy Company in Pasadena, Calif.; while the modified electric typewriters are available from many sources, such as the International Business Machines Company.

The compression concept of the present invention is based on information theory and the principle of information content. It is likely that documents such as a printed page, sketch, or engineering drawing, contain no more than 20% information or "image bits" and the remainder of non-information "position bits." Such standard format areas as margins, spaces between words, lines, etc., contribute to the latter. The occurrence of these spaces is somewhat predictable and the predictability of their occurrence can be written as a definite value.

The information content of a transmission can be shown to be:

$$H=-\frac{T}{\tau}\sum_{j=1}^{n} P_j \log_2 P_j$$

T=total transmission time $\tau$=minimum time for change of signal level during transmission $P_j$=probability of occurrence of the $j$th signal level N=number of signal levels possible Logarithms are taken to the base two because the given signal level is bistable; a level either exists or it does not.

Assumnig a typical transmission were 80% as background, 20% informative bits, the following table illustrates a relationship of probability to signal level:

| N (type signal) | $P_n$ (probability of occurence | Selected audio frequency |
|---|---|---|
| 0, Line or image bit | .2 | 2,600 |
| 1, 1 bit background space | .3 interior letter space | 2,800 |
| 2, 2 bit background space | .1 interior letter space | 2,400 |
| 3, 3 bit background space | .01 random space | 1,800 |
| 4, 4 bit background space | .01 random space | 1,600 |
| 5, 5 bit background space | .01 random space | 1,400 |
| 6, 6 bit background space | .04 between letters | 2,200 |
| 7, 7 bit background space | .01 random space | 1,200 |
| 8, 8 bit background sapce | .01 random space | 1,000 |
| 9, 9 bit background space | .01 random space | 2,000 |
| 10, 10 bit background space | .3 in multiples for margins between lines, etc. | 3,000 |

Thus, eleven levels are to be transmitted at individual audio frequencies having 200 c.p.s. steps between 1 kc. and 3 kc. The audio frequencies are assigned so that the highest probability signal levels are coded into the highest frequencies, allowing the transmission rate to be a maximum. The average frequency for the distribution in the table above, for example, is 2580 c.p.s.

If $T=30$ seconds, $\tau=1/2580$ second, solving for H.

$$H=-\frac{T}{\tau}\sum_{J=1}^{\eta}P_j\log_2 P_j$$

$$=-\frac{30}{1/2580}\sum_{j=1}^{11}P_j\log_2 P_j$$

$$=1.875\times10^5 \text{ bits or almost } 20\% \text{ of the total } 10^6 \text{ bits}$$

Approximately one positioning bit per information bit is required for placement during successive scans. Therefore, if the "dead space" is compressed by utilizing position bits which consist of an 11 level signal, the information could be transmitted with $.4\times10^6$ rather than $10^6$ bits.

Figure 2:
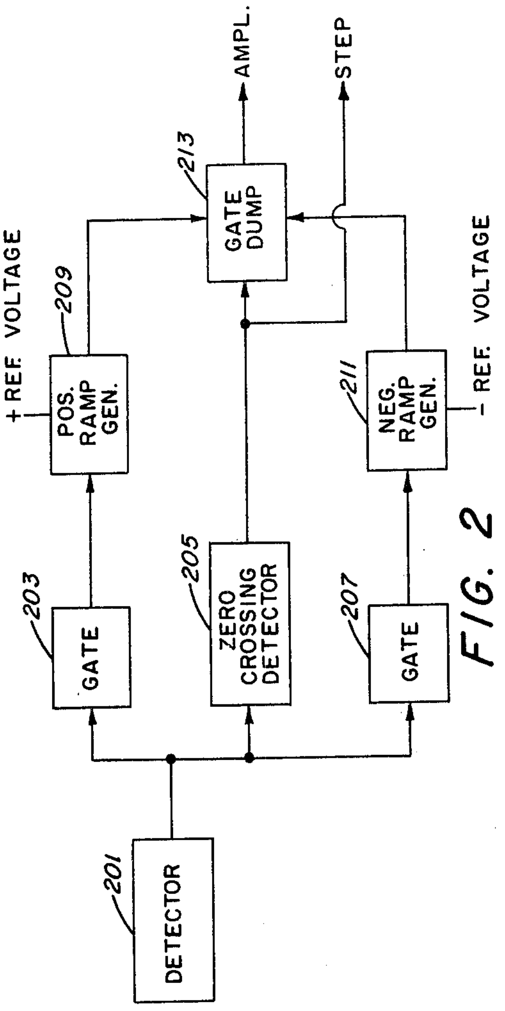
FIGURE 2 is a block diagram of the circuits for the conversion of the pulse duration modulation signals into the pulse amplitude modulation signals.

Referring now to FIGURE 2, detector 201 generates the black and white signals indicative of the scanned information. Gate 203 is responsive to the black to white information changes while gate 207 is responsive to white to black information changes. Positive ramp generator 209 is coupled to the output of gate 203 to generate a fixed voltage which is proportional to the length of the information run length of one color, i.e., black or white. Negative ramp generator 211, coupled to gate 207, generates the negative voltage responsive to the opposite color run length of information. The zero-crossing detector 205 generates a signal every time the detected information from detector 201 crosses an axis which is representative of the long term average value of the information signal. More particularly, the detector generates a signal every time there is a change of information from black to white or white to black. Inasmuch as such information would be representative of a change in run lengths, the output therefrom can be used as a stepping signal to be used further in the system hereinafter described in conjunction with FIGURE 3. The gate dump 213 is responsive to the same signal which is used to gate the outputs of the positive and negative ramp generators 209 and 211.

Figure 3:
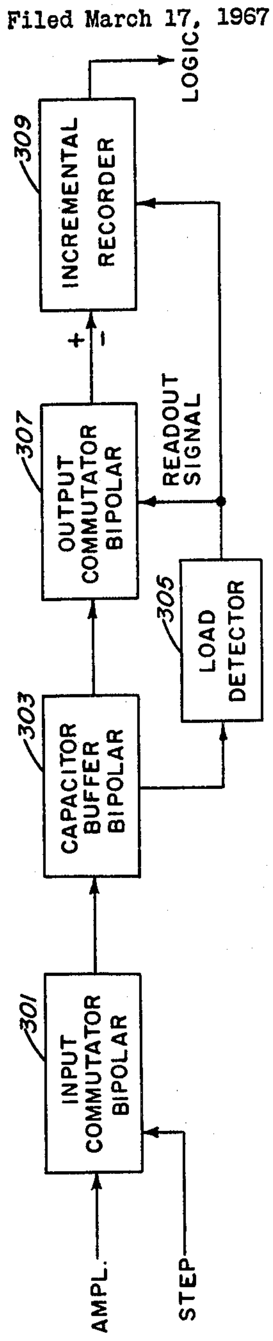
FIGURE 3 is a block diagram of the circuits for the transfer of the pulse amplitude modulation signals from a buffer unit to an incremental recording system.
Figure 4:
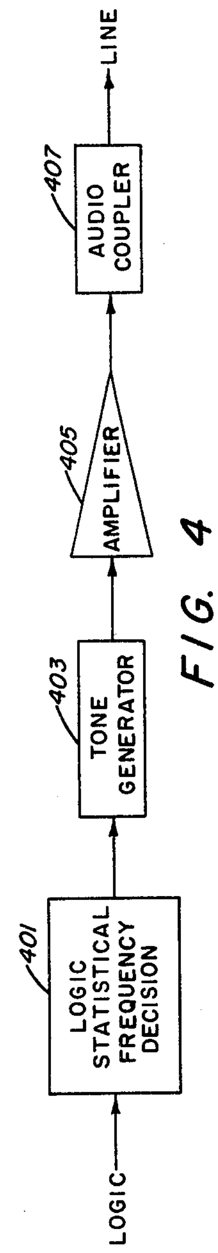
FIGURE 4 is a block diagram of circuits for the generation of the multi-level frequency modulation tone signals.

Referring now to FIGURE 3, the input positioning code voltage level, which is proportional to the amount of consecutive background space scanned, is fed to the input commutator 301 at the stepping rate provided by the zero-crossing detector 205. The commutator 301 selectively enters into the capacitor buffer 303, the voltage levels generated by the positive and negative ramp generators 209 and 211, as shown in FIGURE 2. The scan and store sequence continues until the capacitor buffer 303 is filled to approximately 60%, for example, of the temporary storage capacity. At this time, load detector 305 detects the 60% storage, and initiates a sequential discharge through the output commutator 307 to the incremental recorder 309. The magnetic tape of the recorder 309 had already begun a constant speed slew at the detection of the 60% fill mark. The tape writing speed is such that the capacitor stored buffer is 50%, for example, discharged when the scan and store unit has completed 90% of the capacitor storage. At that time, the first half of the capacitor store is driven to a reference level and is ready to accept new scan charged information. After the remainder of the capacitor store has been filled and storage input has been switched to the first section again, the last half of the capacitor bank is discharged through the writing head to the tape, that portion of the capacitor store is then referenced, and the cycle repeated. Any of the known capacitor and associated commutators known in the art could be utilized for the hereinbefore mentioned functions.

After the document has completely incrementally recorded on recorder 309, the record is played back at a constant speed and the output coupled to the logic statistical frequency decision circuit 401. This decision unit, which may comprise a network of logic circuitry, is responsive to the voltage levels incrementally recorded at recorder 309 and generates enabling signals for use by the tone generator 403 of any known design. The output from the tone generator 403 would be the 11 tones indicative of the information run lengths, as hereinbefore described. The information would then be amplified at 405 and acoustically coupled to the transmission line by the audio coupler 407.

Figure 5:
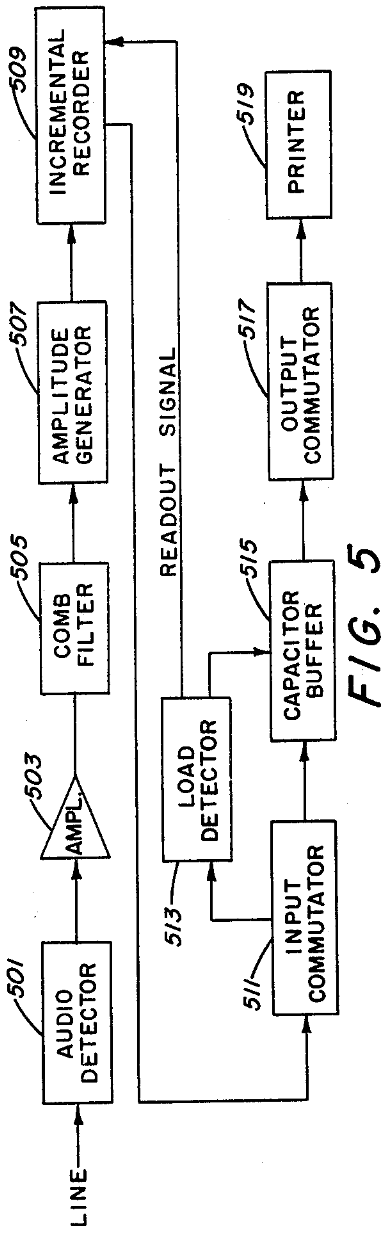
FIGURE 5 is a block diagram of a receiver unit and the circuits for conversion of the transmitted information signal to the application by a printer.

At the receiving end, as shown in FIGURE 5, the received audio frequencies would be detected at the audio detector 501 and coupled to amplifier 503 for application to the comb filter 505. The comb filter is a selective filtering unit of narrow bandpass filters which generate a plurality of fixed output voltages in response to the selective input frequency signals. These voltages would be coupled to the amplitude generator 507 for reconstituting the voltage waveform indicative of the information run lengths. The output from the amplitude generator 507 would be the same signal that appears at the outputs of the positive end negative ramp generators 209 and 211 in FIGURE 2. These amplitude signals would then be coupled to the incremental recorder 509, which records the signals at a contant speed. After the entire information segment has been recorded the recorder 509 would be incrementally read out from the recorder to the input communtator 511. In a manner similar to that described in conjunction with FIGURE 3 above, the capacitor buffer 515 stores the input information and by means by load detector 513, signals the incremental recorder 509 to further produce the information for application to the input commutator 511. Coupled to the capacitor buffer 515 would be the output commutator 517, which now passes the pulse duration modulation signals for utilization by any output printing mechanism at 519.

The printer 519 may comprise a flying spot scanner, for example, similar to the type that may be employed in the facsimile transmitter as set forth with the scanner described in conjunction with FIGURE 2. It is to be understood, however, that any of the types of printers known in the art may be employed in practicing the present invention.

In the foregoing there has been described novel and improved apparatus for reducing the bandwidth requirements for the transmission of redundant information in a graphic communication transmission system. While the subject invention has been described in conjunction with an 11-level frequency modulation signal, it is apparent that any amount of tone signals may be utilized in accordance with the type of information to be transmitted. Further, a system has been described in conjunction with an acoustically coupled telephone network, but it would be apparent to those skilled in the art that any transmission media may be utilized without deviating from the principle of the present invention. Thus, while the present invention, as to its objects and advantages, as described herein, has been set forth in specific embodiments thereof, they are to be understood as illustrative only and not limiting.

What is claimed is:

1. In a graphic communication system, the method of transmitting information with reduced redundancy comprising the steps of generating signals of different predetermined voltage amplitudes in accordance with the run lengths of detected groups of successive binary digits of a first and second binary level, and further generating predetermined tone frequency signals in response to said voltage amplitude signals wherein the higher the probability of occurrence of a particular binary digit run length the higher the frequency of the generated tone signal.

2. The method of reduced redundancy transmission of graphic information comprising
- generating pulse duration modulation signals in accordance with the information to be transmitted,
- converting said pulse duration modulation signals into pulse amplitude modulation signals, the amplitudes of which being a function of the pulse duration, and
- transmitting a plurality of frequency modulation tone signals in response to the pulse amplitude modulation signals in accordance with the probability of occurrence of the information to be transmitted.

3. The method as defined in claim 2 wherein the step of generating includes
- detecting the information to be transmitted as run lengths of first and second level binary electrical signals.

4. The method as defined in claim 3 wherein the step of converting includes
- converting said run lengths of first and second level binary electrical signals into voltage signals the amplitudes of which are a function of the duration of said run lengths,
- storing said voltage signals at the rate at which they were generated,
- incrementally recording said stored voltage signals at a constant rate, and
- replaying said recorded voltage signals at a rate compatible with the transmission of the frequency modulated tone signals.

5. The method as defined in claim 4 wherein the step of transmitting includes
- generating said tone signals in accordance with the probability of occurrence of said run lengths of said first and second binary level in order that the generated tone signals increase in frequency in direct relationship with the more probable occurring run lengths.

6. The method of recovering graphic information transmitted as a plurality of tone frequency signals representative of run lengths of first and second level binary electrical signals, said tone signals increasing in frequency in direct relation to the increasing probability of occurrence of said run lengths, comprising the steps of
- generating a plurality of pulse amplitude modulation signals in response to said tone frequency signals, the amplitude of which being a function of the pulse duration, and
- converting said pulse amplitude modulation signals into pulse duration modulation signals in accordance with the information run lengths of said first and second binary level.

7. The method of recovering graphic information transmitted as a plurality of tone frequency signals representative of run lengths of first and second level binary electrical signals, said tone signals increasing in frequency in direct relation to the increasing probability of occurrence of said run lengths, comprising the steps of
- converting said tone frequency signals into voltage signals the amplitudes of which are a function of the duration of said run lengths,
- continuously recording said voltage signals at a constant rate,
- incrementally replaying said recorded voltage signals,
- storing said recorded voltage signals at the rate at which they were replayed, and
- generating said run lengths of first and second binary signals from said stored voltage signals.

8. A graphic communication system wherein binary electrical signal information is transmitted with reduced redundancy comprising
- facsimile scanner means for generating pulse duration modulation signals in accordance with the information on a document,
- first circuit means for converting said pulse duration modulation signals into pulse amplitude signals, the amplitudes of which being a function of the pulse duration, and
- second circuit means for generating a plurality of frequency modulated tone signals in response to the pulse amplitude modulation signals in accordance with the probability of occurrence of the information to be transmitted.

9. A system as defined in claim 8 wherein said first circuit means includes
- first and second ramp generating means for generating positive and negative ramp voltages respectively the amplitudes of which are a function of the duration of said pulse duration modulation signals,
- buffer storage means for storing said ramp voltages at the rate at which they were generated,
- incremental recording means for recording said stored ramp voltages at a constant rate, and
- means for replaying said incremental recording means after a complete message unit has been recorded.

10. A system as defined in claim 9 wherein said second circuit means includes
- statistical logic circuit means for generating enabling signals in accordance with the statistical probability of occurence of said pulse duration modulation signals, and
- tone generating means responsive to said enabling signals for generating frequency modulated tone signals with the frequency thereof increasing with the increasing probability of occurrence of said pulse duration modulation signals.

11. A facsimile communication system for transmitting graphic information with reduced redundancy comprising
- facsimile scanner means for generating first and second level binary signals in accordance with the scanned information,
- voltage generating means for generating predetermined voltage amplitude signals as a function of the run lengths of said first and second level binary signals, and
- tone generating means responsive to said voltage amplitude signals for generating a plurality of frequency modulated tone signals with the frequency of said tone signals increasing with the increasing probability of occurrence of said first and second level binary signal run lengths.

12. A system as defined in claim 11 wherein said voltage generating means includes
- first and second gating means responsive to the first to second and second to first binary signal transitions respectively,
- first and second ramp generating means coupled to said first and second gating means for generating positive and negative ramp voltages the amplitudes of which are a function of the lengths of said first and second level binary signal run lengths, and
- third gating means coupled to said first and second ramp generating means for gating said ramp voltages at each transition of said binary signals.

13. A system as defined in claim 12 further including
- buffer storage means for storing said voltage amplitude signals,
- input commutator means coupled to the input of said buffer storage means for directing the area of storage therein at the rate said voltage amplitude signals were generated,
- output commutator means coupled to the output of said buffer storage means for directing the rate at which signals are to be read out of said buffer storage means, and
- recording means for recording said stored voltage amplitude signals at a constant incremental rate.

14. A system as defined in claim 13 wherein said tone generating means includes means for replaying said recording means after a complete message unit has ben recorded, and statistical logic circuit means for generating enabling signals in accordance with the statistical probability of occurrence of said voltage amplitude signals, means responsive to said enabling signals for generating frequency modulated tone signals with the frequency of said tone signals increasing with the increasing probability of occurrence of said voltage amplitude signals indicative of the run lengths of said first and second binary signals.

15. A system as defined in claim 14 further including means for acoustically coupling said frequency modulated tone signals to a transmission media, said tone signals being in the audio frequency range.

16. In a graphic communication system wherein frequency modulated tone signals are transmitted representative of information run lengths of first and second level binary electrical signals, said tone signals increasing in frequency as a function of the increasing probability of occurrence of said run lentghs, a receiver comprising filter means for generating a plurality of enabling signals in response to said frequency modulated tone signals, amplitude generating means responsive to said signals for generating voltage signals the amplitudes of which are a function of the duration of said run lengths, recorder means for recording said voltage signals at a continuous rate and for incrementally replaying said voltage signals at a constant rate.

buffer storage means for storing said signals upon playback from said recorder means, and means for converting said vlotage signals into said run lengths of first and second level binary electrical signals.

17. The receiver as defined in claim 16 wherein said buffer storage means includes input commutator means coupled to the input of said buffer storage means for directing the area of storage therein at the rate said signals are played back from said recorder means, and output commutator means coupled to the output of said bufler storage means for directing the rate which signals are to be read out of said buffer storage means.

References Cited

UNITED STATES PATENTS

| | | | |
|---|---|---|---|
| 3,430,145 | 2/1969 | Lord | 179—15.55 XR |
| 3,381,093 | 4/1968 | Flanagan | 179—15.55 |
| 3,344,231 | 9/1967 | Dodd | 179—15.55 XR |

KATHLEEN H. CLAFFY, Primary Examiner

B. P. SMITH, Assistant Examiner